United States Patent
Shah

(10) Patent No.: US 8,442,480 B2
(45) Date of Patent: May 14, 2013

(54) PRIORITY COMMUNICATIONS IN A SHARED ACCESS TELECOMMUNICATIONS NETWORK

(75) Inventor: Mehul Shah, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 13/072,565

(22) Filed: Mar. 25, 2011

(65) Prior Publication Data
US 2012/0142306 A1 Jun. 7, 2012

Related U.S. Application Data

(60) Provisional application No. 61/418,769, filed on Dec. 1, 2010.

(51) Int. Cl.
*G06F 15/16* (2006.01)
(52) U.S. Cl.
USPC ........................................ 455/404.1; 455/406
(58) Field of Classification Search ............... 455/404.1, 455/406, 414.1; 370/230, 231, 338
See application file for complete search history.

(56) References Cited

U.S. PATENT DOCUMENTS

| 7,305,251 | B2 | 12/2007 | Kuchibhotla et al. |
| 2008/0250156 | A1 | 10/2008 | Agarwal et al. |
| 2010/0284278 | A1 | 11/2010 | Alanara |
| 2011/0219431 | A1* | 9/2011 | Akhtar et al. ............... 726/4 |

OTHER PUBLICATIONS

"3GPP TS 29.215 V9.2.0: 3rd Generation Partnership Project; Technical Specification Group Core Network and Terminals; Policy and Charging Control (PCC) over S9 reference point; Stage 3" 3GPP Organizational Partners, Mar. 2010, 36 pgs.
Brouwer, "QoS in LTE PSCR Demo Days", Alcatel Lucent, Dec. 2010, 34 pages.
Calhoun, et al., "Diameter Base Protocol", The Internet Society, Sep. 2003, 147 pages.
"Specification for Priority in Preferential Telecommunications over IPCablecom2 Networks", Society of Cable Telecommunications Engineers, 2010, 24 pages.

* cited by examiner

*Primary Examiner* — Sam Bhattacharya
(74) *Attorney, Agent, or Firm* — Lee & Hayes, PLLC

(57) ABSTRACT

Described herein are systems and techniques that can coordinate priority communications for the users of one telecommunications network relative to the users of other such networks. This may be useful in emergency situations where one of the networks comprises a public services entity, which may from time to time demand priority communications in order to efficiently respond to urgent situations.

22 Claims, 2 Drawing Sheets

PRIORITY COMMUNICATIONS IN A SHARED ACCESS TELECOMMUNICATIONS NETWORK

CROSS REFERENCE TO RELATED PATENT APPLICATIONS

This patent application claims priority from U.S. Provisional Application No. 61/418,769, filed Dec. 1, 2010, which application is hereby incorporated in its entirety by reference.

BACKGROUND

Communication network operators such as cellular service operators may form partnerships to share radio spectrum resources and to cooperate in building a radio infrastructure so that their subscribers can operate using this shared resource. This is commonly referred to as RAN (radio access network) sharing. There are existing standards and protocols that allow such resource sharing between network operators, while also allowing each network operator to operate its own separate network core (packet and/or circuit switched), along with its own subscriber database and backend billing infrastructure.

In some cases, resource sharing such as this may be particularly important, such as in the case of disasters or other emergencies. In situations such as this communication networks often become congested, making it difficult for emergency responders and public safety entities to communicate.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are components, devices, and techniques that allow the subscribers of one or more wireless telecommunications operators to be given communications priority over the subscribers of other operators in a shared resource environment. This capability can be used in situations where one network operator is an emergency responder, public safety provider, or other public service entity, to ensure that vital communications are handled with priority.

Figure 1:
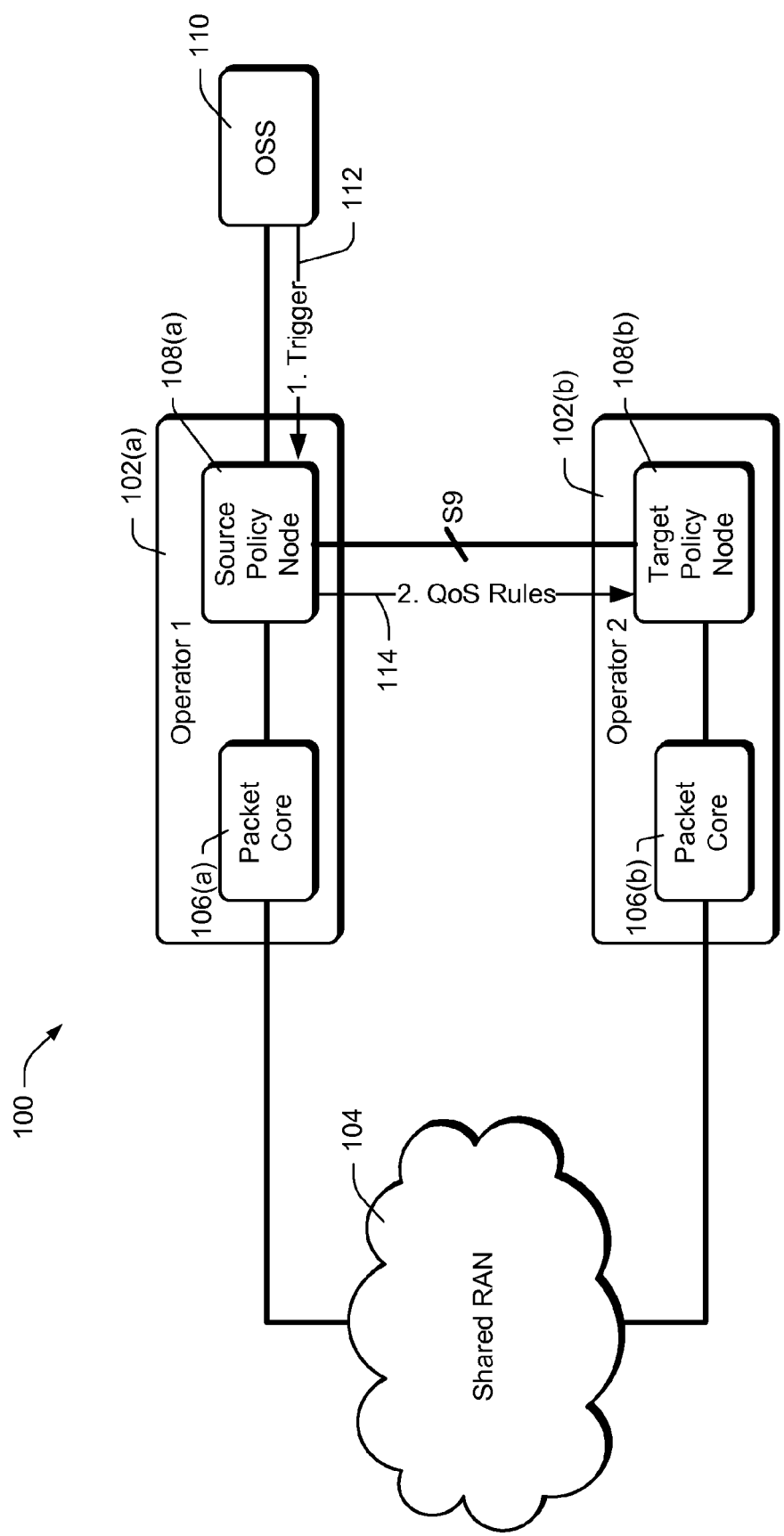
FIG. 1 is a block diagram illustrating a shared radio access network environment in which the techniques described herein may be implemented.

FIG. 1 shows an example of a shared RAN (radio access network) infrastructure 100 such as might be implemented by cellular or other wireless telecommunications providers, and which embodies the techniques described herein. The infrastructure 100 includes a plurality of network operators 102, of which two are illustrated: a first network operator 102(a) and a second network operator 102(b). The network operators cooperate to utilize a common RAN (radio access network) 104, which is shared between the network operators 102.

Each network operator 102 comprises a network or packet core 106 and a policy node 108. Specifically, the first network 102(a) comprises a network or packet core 106(a) and a policy node 108(a), and the second network 102(b) comprises a network or packet core 106(b) and a policy node 108(b). In some implementations, the policy nodes may be considered part of their corresponding network cores.

A network or packet core is a high-level part of an operator network, providing services such as charging, call routing, and data and messaging communications to subscribing customers. The common RAN 104 is shared and used by the multiple network cores 106.

A policy node 108 is a policy repository/engine associated with each operator network, and is responsible for real-time policy decisions and for providing policies to enforcement points within the operator networks 102. In the described embodiments, each policy node 108 may comprise a PCRF (Policy and Charging Rules Function). Each operator may deploy its own PCRF for enforcing policies with respect to its subscribers. Policy nodes 108 will be alternatively referred to as PCRFs 108 in the following discussion, but it is to be understood that policy nodes 108 are not limited to PCRFs.

PCRFs 108 of different operators can typically communicate with each other to accommodate subscriber roaming situations, in which a subscriber who is outside the range of his or her provider's "home" network may utilize the "visited" network of another provider as a "roaming" or "visiting" user. In certain implementations, many of these communications (as well as various functions of the PCRFs) are defined by what is known as the 3GPP (Third Generation Partnership Project) specification, which operates in the context of a lower level communication protocol that is referred to as the DIAMETER base protocol. These specifications and protocols are described in the following public documents:

3GPP TS 29.215—Policy and Charging Control (PCC) over S9

Reference Point; Stage 3; and

RFC3588—DIAMETER Base Protocol.

Generally, existing implementations allow the PCRF 108 of a visited network 102 to retrieve usage policies that should be applied to an individual roaming user on the visited network 102, by retrieving such policies from the PCRF 108 of the user's home network 108. These communications are typically initiated when the user appears on or initiates a session on the visited network 108.

It is proposed herein that inter-PCRF communications be extended and additionally utilized to coordinate and implement global prioritization for subscribers of one network provider relative to subscribers of other network providers, particularly in temporary and/or unexpected situations where the prioritized network provider comprises or represents an emergency services entity or public safety provider that is operating under urgent and/or time-critical conditions.

With respect to FIG. 1, assume for example that the first operator 102(a) is an emergency services entity, public safety provider, or other public service entity, which may at times request or demand priority communications for its associated users over the common RAN 104. The operator 102(b) represents one or more other operators having subscribers whose communications will be given relatively less priority in these situations.

In operation, the PCRFs 108 of the respective network cores 106 communicate with each other to coordinate policies with respect to individual users and user sessions, particularly to accommodate roaming scenarios in which a user of one network 102 initiates a session within another network 102. The PCRFs 108 communicate using commands of a predefined format, wherein each command specifies an individual session identifier and associated policies applicable to the session referenced by the session identifier. For example, such a command may comprise what is referred to as a RAR (Re-Auth-Request) command. As defined by the DIAMETER protocol, the RAR command includes a session identifier (referred to as "Session-Id") as an argument. The RAR command may include or indicate policies that are applicable to the single session referenced by the session identifier.

The 3GPP and DIAMETER specifications define other types of predefined commands that may also be used in this environment to communicate policies corresponding to individual sessions. Generally, different commands are encapsulated in a DIAMETER message containing a command code (referred to as "Command-Code" in the DIAMETER protocol) corresponding to a particular command (such as an RAR command) and one or more arguments that are referred to as AVPs (Attribute-Value Pairs). The session identifier and policies are represented in the DIAMETER message as AVPs of the RAR command. In particular, the session identifier is indicated by the "Session-Id" AVP and the policies are indicated by the "QoS-Rule-Install" AVP, both of which may accompany the RAR command.

In addition to these single-session communications defined by the existing protocols and specifications, however, the PCRFs 108 of FIG. 1 are able to communicate global policies, to be applied on a temporary basis in response to a demand for priority communications by the first operator 102(a). Rather than applying to a single identified session, these globally overriding policies are applicable to multiple sessions. For example, such global policies may grant relatively higher session priority to all or specified users of the first network 102(a), and relatively lower priority to all users of the second network 102(b).

To initiate this condition, an OSS (Operations Support System) 110, or some other component/entity associated with the first operator 102(a), may generate a trigger 112 to notify the PCRF 108(a) of the first operator 102(a) that priority communications are to be implemented for the subscribers of the first operator 102(a). The PCRF 108(a) in this situation will be referred to as the source PCRF 108(a).

The trigger 112 may be initiated by the operator 102(a) in response to an emergency condition or other temporary condition in which the subscribers of the first operator 102(a) need priority communications in order to carry out important and/or critical services. In other embodiments, the trigger 112 may be in response to other temporary or unexpected conditions in which reprioritization of multiple sessions is desired by one operator. For example, suppose that a first operator has certain users who have subscribed to priority service, and that one or more of those users encounter congestion at a particular cell tower of a second operator. The first operator may initiate the trigger 112 in this situation to request prioritization of these users' sessions by the second operator.

As another example, a public agency that is not necessarily associated with any single operator may initiate the trigger 112 to multiple operators and PCRFs, to request prioritization on behalf of users who are associated with the public agency or who are known by the agency to have need for priority communications on a temporary basis.

In many cases, agreements will be in place between operators for these purposes. It is assumed in these scenarios that there is a trust relationship between the operators, and that an operator will not generate the trigger 112 for frivolous reasons. Also note that the decision regarding which PCRF assumes the role of the source PCRF is a matter of operator agreements.

In response to the trigger 112, the source PCRF 108(a) communicates with the PCRFs 108(b) of other operators such as the second operator network 102(b) to communicate overriding QoS policies. These PCRFs 108(b), whose subscribers will be given lower priority, are referred to as target PCRFs 108(b). The PCRF 108(b) of FIG. 1 is considered a target PCRF 108(b) in this scenario.

The communication from the source PCRF 108(a) to the target PCRFs 108(b) indicates one or more temporary, overriding QoS (quality of service) or policy rules 114 that are to be applied globally by the second operator 102(b), to multiple sessions that may include those of both home users and visiting users. These QoS rules, which may be specified either implicitly or explicitly, may affect some or all of the subscriber sessions of the target PCRF 108(b). Generally, the policies 114 indicate that the subscribers of the first operator 102(a) are to be given higher priority than the subscribers of the second operator 102(b). The QoS rules may apply to both existing communication sessions and newly initiated communication sessions.

The target PCRF 108(b) receives the communication from the source PCRF 108(a), including the indication of temporary, overriding QoS rules 114. In response, it validates the communication and the requested policies in accordance with its own criteria and the criteria that have been previously been agreed upon between the providers. Assuming that the request is valid and legitimate, the target PCRF 102(b) implements the indicated QoS rules, giving priority to communications of the subscribers of the first operator 102(a) relative to those of the second operator 102(b). This may include reprioritizing existing sessions, as well as implementing newly requested sessions in accordance with the temporary QoS rules.

The temporary and overriding QoS rules may remain in effect until the source PCRF sends another communication to the target PCRF, explicitly withdrawing the request for priority communications. Alternatively, each request by the source PCRF may specify (implicitly or explicitly) a limited time period that will expire automatically unless another request is sent.

The QoS rules 114 may be specified as an explicit part of the communication form the source PCRF 108(a) to the target PCRF 108(b). Alternatively, the temporary QoS rules may be specified ahead of time, and specified by reference to one or more pre-agreed-upon rule sets.

In the described environment, the overriding QoS rules 114 are communicated using a command of the predefined DIAMETER format as described above, in which the session identifier is replaced by a reserved value that is recognized by the different PCRFs 108) and/or network cores 104 as signifying the presence of overriding QoS policies. For example, the overriding rules may be communicated using a DIAMETER RAR command, as part of the 3GPP PUSH method for unsolicited provisioning In an implementation such as this, the QoS policies may be indicated by an AVP of the RAR command; e.g., by the QoS-Rule-Install AVP of the RAR command. The reserved value is indicated by the Session-ID AVP of the RAR command.

Figure 2:
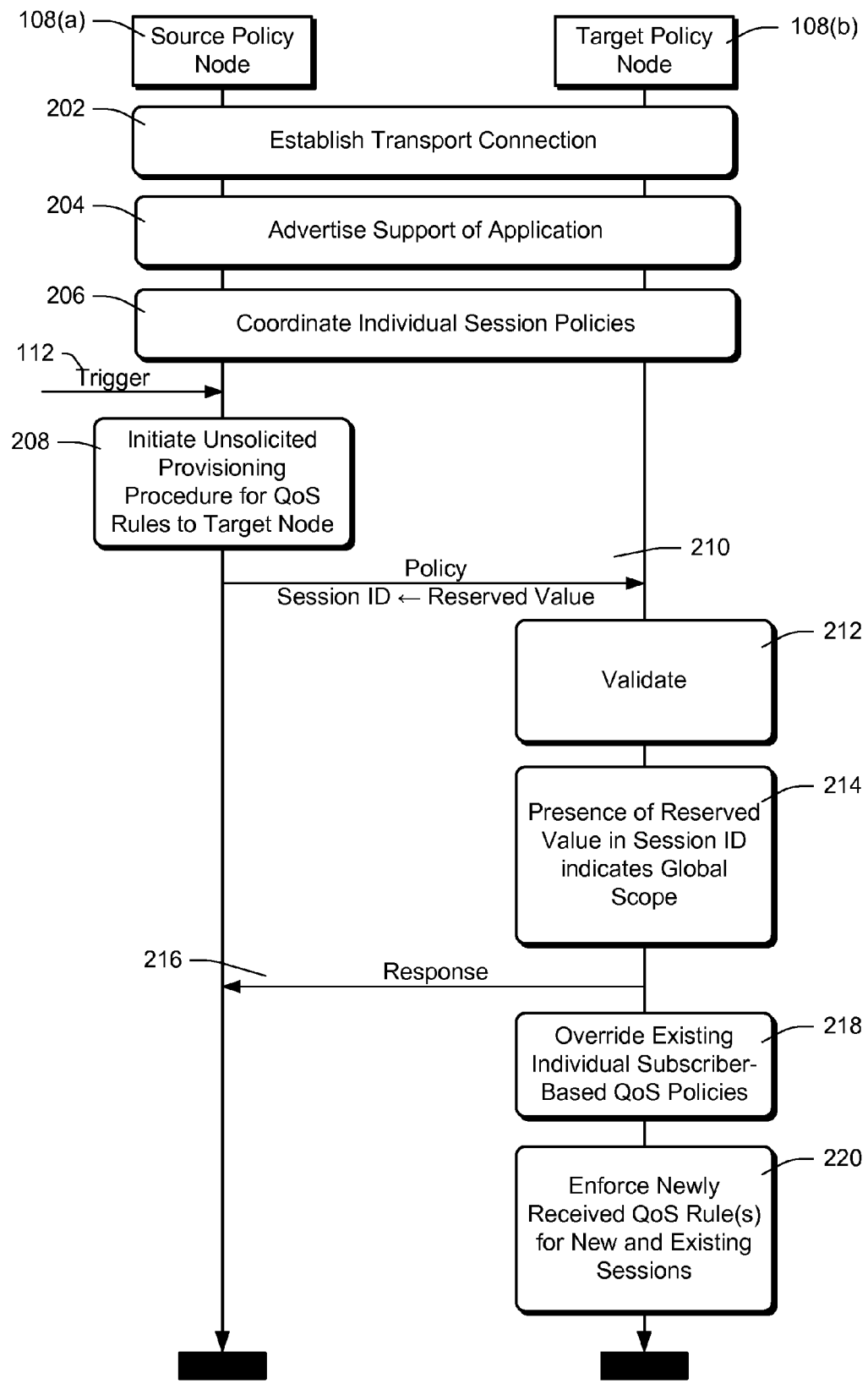
FIG. 2 is a flow diagram an example implementation of the described techniques.

FIG. 2 shows an example of how communications may be implemented between the source PCRF 108(a) and the target PCRF 108(b). At 202, a connection, such as an S9 transport connection, is established by the source and target PCRFs 108. This connection may be established in a manner as defined by the DIAMETER protocol in RFC3588. At 204, support of an application, such as an S9-specific application, is advertised by both the source and target PCRFs 108. The support may be advertised by exchanging Capabilities-Exchange-Request (CER) and Capabilities-Exchange-Answer (CEA) messages as explained in the DIAMETER specification RFC3588, with the Vendor-ID and Vendor-Specific-Application-ID AVP as explained in 3GPP TS 29.215.

Once the connection has been set up, both the source PCRF 108(a) and the target PCRF 108(b) continue to function as normal, assuming the roles of home and visited PCRFs, depending on the roaming scenario. Block 206 represents communicating and coordinating individual session policies amongst policy nodes of multiple networks, to coordinate QoS policies with respect to individual sessions using the predefined RAR format specified above that includes or indicates a single-session identifier and associated QoS rules.

Upon detecting a network change or emergency situation in which priority access is appropriate or desired, as indicated by the trigger 112, the source PCRF 108(a) initiates the provisioning of global policies (e.g. QoS rules) into the target PCRF 108(b). In the described embodiment, this can be accomplished as follows.

At 208, the source PCRF 108(a) issues an unsolicited communication, such as an unsolicited PUSH communication, to the target PCRF 108(b). Such an unsolicited PUSH communication, as described at section 4.5.3.2 of the 3GPP specification, is used by a home PCRF to provision rules in a visiting PCRF for an individual communications session. The PUSH communication involves a RAR (Re-Auth-Request) message specifying the session ID of an existing session and one or more policies or QoS rules to be implemented with respect to the specified existing session. In accordance with the techniques described herein, however, the source PCRF 108(a) sends a policy 210, such as a RAR command that instead specifies a reserved value as the session identifier or Session-ID AVP. The reserved value does not correspond to any individual session. Rather, the reserved value is a value that has been agreed upon among operators to indicate global application of the indicated policies or rules to a plurality of sessions. The global policies are indicated by the QoS-Rule-Install AVP of the RAR command.

The target PCRF 108(a) receives the communication or RAR, and at 212 validates at least one of (a) the source of the communication and (b) the requested QoS rules/policies. This validation ensures that the rules are from a trusted source PCRF (which may be done using the originating realm/domain of the request) and that the QoS rules conform to operator agreements. In addition validation may, in some embodiments, deal with prioritizing communications from different source PCRFs, and for resolving any conflicts in QoS rules/policies that are concurrently requested by different source PCRFs. Conflicts may be resolved in accordance with agreements previously established between the operators.

At 214, the target PCRF 108(b) detects the presence of the reserved value in the session identifier of the received RAR, which indicates a global scope of the QoS rules specified by the RAR.

After acknowledging the receipt and validity of the RAR 210 by sending a response 216, such as a RAA (Re-Auth-Answer), to the source PCRF 108(a), the target PCRF 108(b) begins enforcing the received QoS policies for both new sessions and existing sessions. Such enforcement may be implemented either statically or dynamically by the target PCRF 108(b) depending on previous agreement between operators. At 218, the target PCRF 108(b) forces a re-authorization of existing sessions, using RAR and RAA messages. In addition, at 220, the target PCRF 108(b) follows standard procedures to propagate the QoS policies down to the radio network (e.g. GGSN→SGSN→RAN), where the schedulers can use the QoS parameters to prioritize access.

These techniques allow global priority policies to be communicated between networks within the framework of existing protocols and formats, by agreeing upon a reserved session identifier value that is understood to indicate the presence in an RAR command of global rules or policies. This does not preclude the introduction of new messages, and does not preclude further enhancing DIAMETER-level AVPs.

Note that although various communications have been described above in the context of protocols such as DIAMETER and S9, the described techniques may be implemented in other embodiments using different communication protocols.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunications system, comprising:
   a plurality of network cores associated with different operators;
   a common radio access network that is shared by the plurality of network cores to allow communications by users associated with the different operators;
   policy nodes associated respectively with each of the network cores, wherein the policy nodes communicate with each other using commands to coordinate QoS policies with respect to individual users, and wherein the commands are of a predefined format that specifies an individual session identifier and associated QoS policies; and
   wherein at least one of the policy nodes is configured to communicate overriding QoS policies to the other policy nodes, in response to temporary network congestion in the radio network core with which the at least one policy node is associated, the overriding QoS policies being communicated using a command of the predefined format in which the individual session identifier is replaced by a reserved value that signifies a presence of overriding QoS policies that are applicable to multiple sessions.

2. The telecommunications system of claim 1, wherein at least one of the operators comprises a public service entity that at times demands priority communications for its associated users over the common radio access network.

3. The telecommunications system of claim 1, wherein the other network cores are configured to implement the overriding QoS policies with respect to multiple users associated with the other network cores in response to receiving the command of the predefined format in which the individual session identifier is replaced by the reserved value.

4. The telecommunications system of claim 1, wherein the other network cores are configured to implement the overriding QoS policies globally in response to receiving the command of the predefined format in which the individual session identifier is replaced by the reserved value.

5. The telecommunications system of claim 1, wherein the other network cores are configured to implement the overriding QoS policies with respect to all users in response to receiving the command of the predefined format in which the individual session identifier is replaced by the reserved value.

6. The telecommunications system of claim 1, wherein the other network cores are configured to validate the overriding QoS policies in accordance with existing operator agreements prior to implementing the overriding QoS policies with respect to multiple users associated with the other network cores.

7. The telecommunications system of claim 1, wherein the policy nodes comprise 3GPP (Third Generation Partnership Project) PCRFs (Policy and Charging Rules Functions).

8. The telecommunications system of claim 1, wherein communicating the overriding QoS policies to the policy nodes is in accordance with the 3GPP (Third Generation Partnership Project) PUSH procedure for unsolicited provisioning.

9. A method comprising:
communicating a request between a source policy node associated with a first telecommunications network and a target policy node associated with a second telecommunications network, in response to temporary network congestion in the first telecommunications network, wherein the request indicates overriding QoS policies that are applicable to multiple sessions of the second telecommunications network;
validating the at least one of the source policy node or the overriding QoS policies; and
enabling application of the overriding QoS policies to the second telecommunication network.

10. The method recited in claim 9, wherein enabling application of the overriding QoS policies comprises overriding QoS policies for existing sessions and new sessions of the second telecommunications network.

11. The method recited in claim 9, further comprising establishing an S9 DIAMETER transport connection between the source and target policy nodes.

12. The method recited in claim 9, wherein the request comprises an RAR (Re-Auth-Request) message that specifies a reserved value as its session identifier, the reserved value signifying that the RAR indicates the overriding QoS policies that are applicable to multiple sessions.

13. The method recited in claim 9, wherein the request comprises a 3GPP (Third Generation Partnership Project) PUSH procedure for unsolicited provisioning, using an RAR (Re-Auth-Request) message that specifies a reserved value as its session identifier, the reserved value signifying that the RAR indicates the overriding QoS policies that are applicable to multiple sessions.

14. A method of establishing priority communications for sessions associated with a public services entity during an emergency, comprising:
communicating overriding QoS policies amongst the policy nodes of multiple telecommunication networks in response to the emergency, wherein the overriding QoS policies are recognized by the policy nodes as signifying overriding QoS policies from the public services entity that are applicable to multiple sessions; and
enabling application of the overriding QoS policies to at least one of the multiple telecommunication networks.

15. The method of claim 14, further comprising:
communicating individual session policies amongst policy nodes of multiple telecommunications networks to coordinate QoS policies with respect to individual sessions, using commands of a predefined format that specifies an individual session identifier and associated QoS policies; and
communicating the overriding QoS policies using a command of the predefined format in which the individual session identifier is replaced by a reserved value that signifies presence of the overriding QoS policies.

16. The method of claim 14, further comprising implementing the overriding QoS policies with respect to existing sessions and new sessions.

17. The method of claim 14, further comprising implementing the overriding QoS policies with respect to multiple sessions.

18. The method of claim 14, further comprising implementing the overriding QoS policies globally.

19. The method of claim 14, further comprising validating the overriding QoS policies in accordance with existing operator agreements prior to implementing the overriding QoS policies with respect to multiple sessions.

20. The method of claim 14, wherein the policy nodes comprise 3GPP (Third Generation Partnership Project) PCRFs (Policy and Charging Rules Functions).

21. The method of claim 14, wherein communicating the overriding QoS policies to the policy nodes uses a RAR (Re-Auth-Request) message.

22. The method of claim 14, wherein communicating the overriding QoS policies to the policy nodes is in accordance with the 3GPP (Third Generation Partnership Project) PUSH procedure for unsolicited provisioning.

* * * * *